Feb. 19, 1935.  A. G. McGREGOR  1,992,084
PRODUCTION AND REFINING OF METALS
Filed Nov. 7, 1931  2 Sheets-Sheet 1
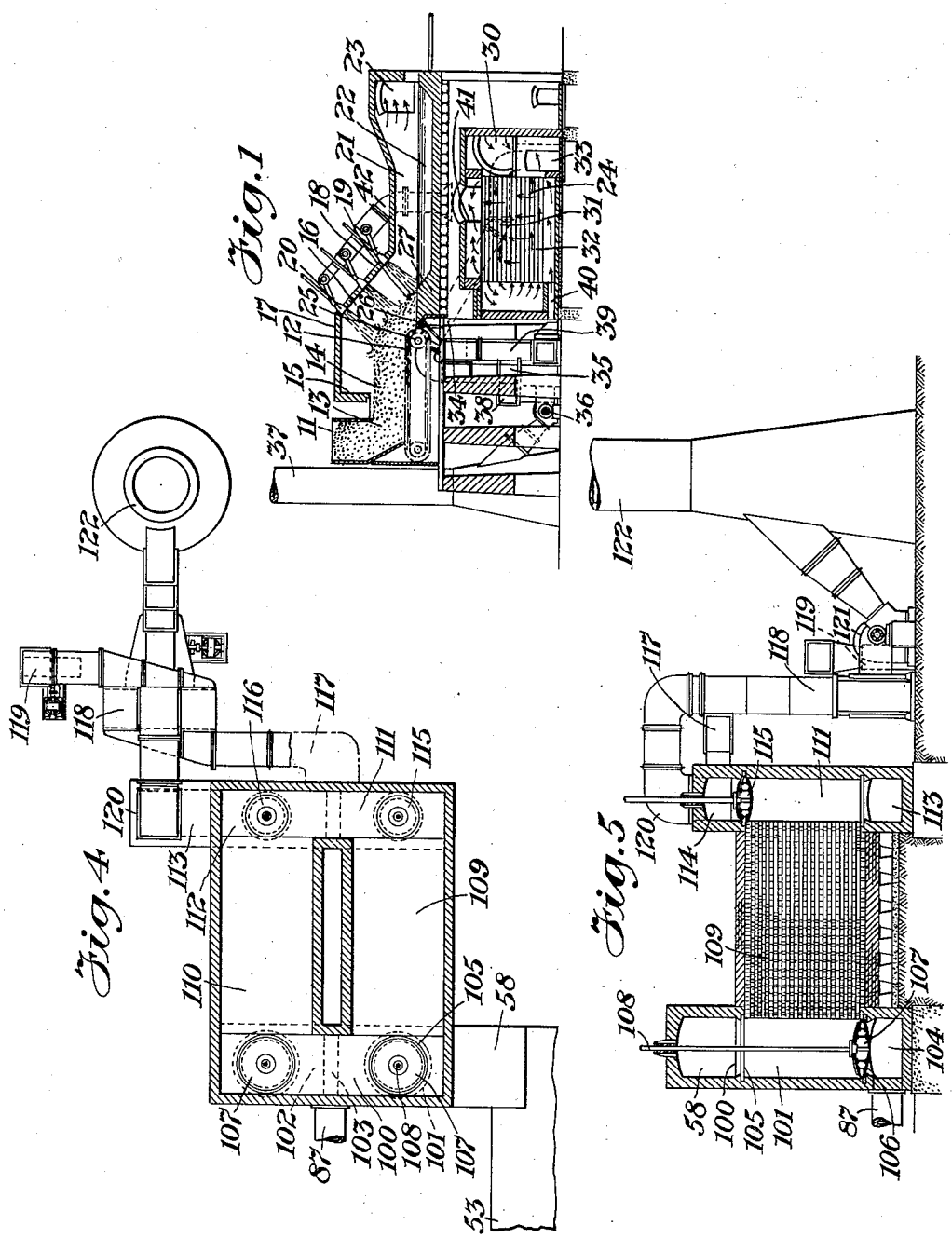
INVENTOR
Alexander G. McGregor
BY
HIS ATTORNEY

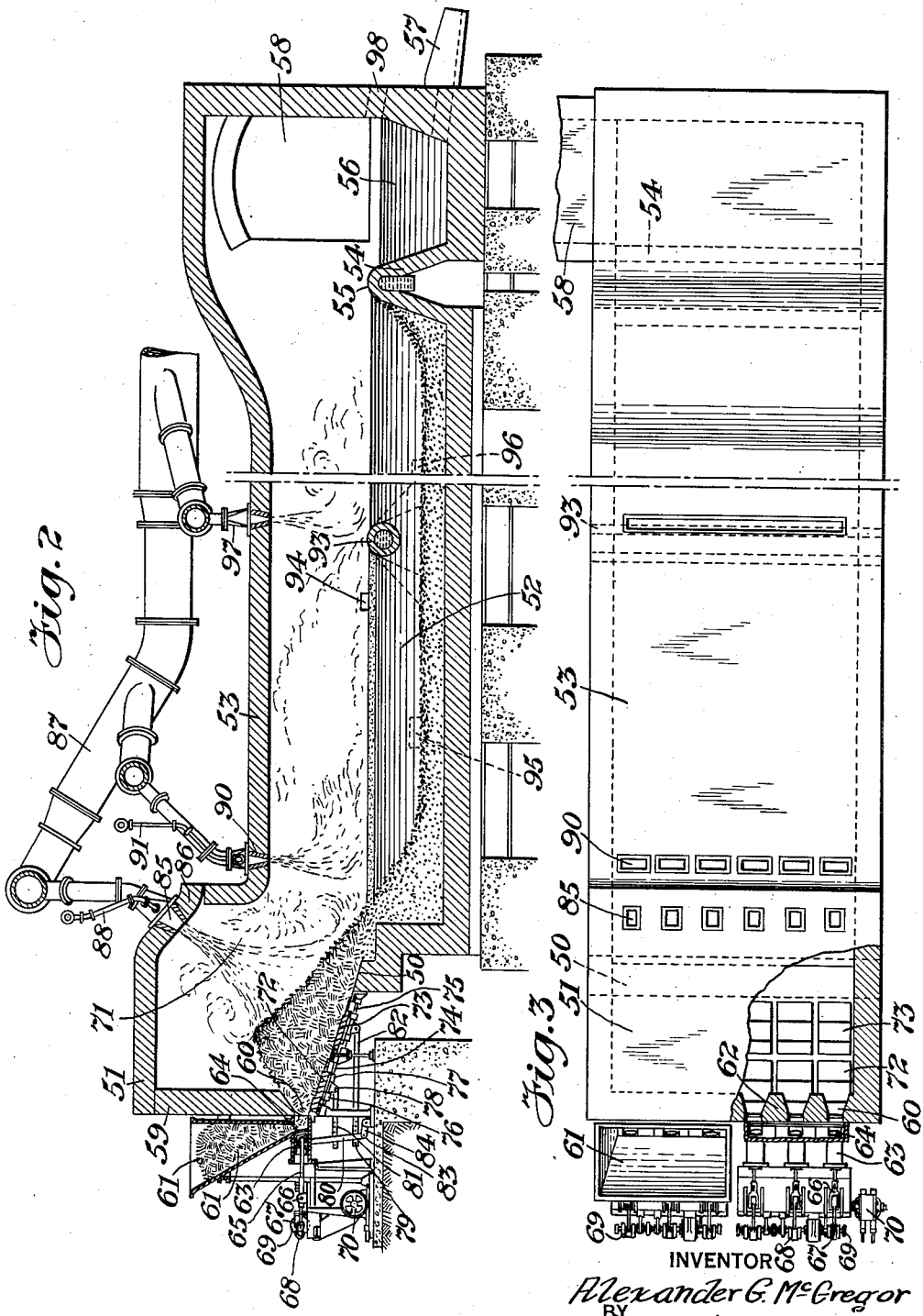

UNITED STATES PATENT OFFICE 1,992,084

PRODUCTION AND REFINING OF METALS

Alexander Grant McGregor, London, England

Application November 7, 1931, Serial No. 573,570
In Great Britain November 11, 1930

2 Claims. (Cl. 75—62)

The present invention comprises improvements in or relating to the production and refining of metals. The invention is applicable to the treatment of the ores of various metals both ferrous and non-ferrous. For example, it is equally applicable to the smelting of copper sulphide ores and the production and refining of iron and steel from iron oxide ores. The invention is also applicable to operations which are kindred to smelting such as the production of glass. One advantage of the invention is that it permits smelting of the ore and refining of the metal produced to proceed in the same furnace with adequate conservation of the heat employed. Furthermore, the production and refining of the metal proceeds continuously. Moreover loss of ore, even finely divided ore, by dusting losses in the flue gases is obviated or minimized. Other advantages and special characteristics of the invention as applied specifically to the treatment of copper sulphide ores or to the treatment of iron ores will be hereinafter pointed out.

According to the present invention a process for smelting ores, and for kindred operations on minerals, is characterized by introducing mineral continuously to a furnace behind a smelting zone, therein moving it forward progressively into the smelting zone so that the front of the mineral presents a sloping face to the smelting zone and applying heating flames directly to the said sloping face of the mineral in the smelting zone, whereby said sloping face is continuously melted and the melted portion allowed to run away down the slope and thus expose fresh material to the flames.

The invention comprises the smelting of sulphide ore by a process as just described characterized by the fact that the ore is introduced as sulphide to the smelting zone and a sufficiency of oxygen is admitted with the heating flames to combine with sulphur from the ore and to utilize the heat of combustion thereof. In the smelting of copper sulphide ores by this process it is a feature of the invention that the ore introduced as sulphide to the smelting zone is burned with a sufficiency of oxygen to combine with a portion only of the sulphur of the ore, thus leading to the production of a molten matte.

Again the invention comprises the smelting of ores, for example iron ores, by a process as above described wherein fuel, which may be fine coal, is admixed with the charge prior to introducing it into the furnace and the ore is thereby reduced in the smelting zone to the metallic state The molten material from the smelting zone may be collected in a well directly adjoining the smelting zone and there maintained in a molten condition and subjected to a refining operation. Thus smelting and refining may proceed in the same furnace. The heated gases from the smelting zone may be passed over the well of molten metal so that their heat is utilized in maintaining the heat of the molten material.

In the smelting of iron oxide ores it is preferable to admix a charge of the ore with solid fuel in excess of that required for reduction and melting, so as to be sufficient to furnish fuel gas for subsequent application of heat to the metal produced, and after smelting the metal to the metallic state in the said smelting zone and collecting the molten metal so produced in a well as aforesaid to introduce air to burn the fuel gas above the molten metal and so to raise its heat to a temperature at which it will be refined while still in the furnace.

The invention furthermore comprises a process for the production of glass which consists in introducing mineral constituents for the manufacture of glass into a furnace and treating them therein in the manner hereinabove set forth.

In contrasting the present invention with general practice heretofore in connection with sulphide ores, it may be pointed out that at one time most sulphide ores were smelted in blast furnaces which with coarse ores were well adapted to the utilization of the heat from the oxidation of part of the sulphur content in melting the ore. On ores rich in sulphur blast furnaces have been operated with a coke consumption as low as 2½% of the weight of the ore. For smelting most copper ores, however, blast furnaces generally required from 11% to 14% of coke.

One trouble with blast furnaces, in attempting to reduce the coke consumption to the minimum, is that if too little is used, the furnace "freezes up" and a great amount of arduous labor is required to clean it out and get it ready for operation again. Blast furnaces moreover are objectionable for smelting fine ores and concentrates on account of the dust formed which is blown out of the furnace without smelting.

In the earlier years only ore fines and a small amount of concentrates were smelted by roasters and reverberatory furnaces. In more recent years most copper ores are first concentrated before smelting and all concentrates for quite a period were roasted in the well known McDougall type roasters, the calcine being smelted in reverberatory furnaces. The calcine is preferably charged along the side walls of the furnace and fuel burners in one end of the furnace supply the heat for smelting. The heat is largely applied against the arch of the furnace and the new charge, which is very dusty, is deposited inside the furnace along its side walls. This operation causes a considerable amount of dust to be swept out of the furnace and the dust coming in contact with the refractory arch fluxes it, causing rapid wear of the arch and expensive repairs.

In reverberatory smelting only a comparatively small amount of sulphur elimination takes place, as only a small amount of oxygen-containing gases comes in contact with the melting charge on the side walls, the main gas flow being along the arch and in the center of the furnace away from the melting charge.

The roasting furnace operation is very dusty. About 5% of the charge issues with the gases from the furnace, and this has to be collected in dust collectors and then delivered to the reverberatory furnace along with the calcine. This calcine transfer is a dusty operation and heat is lost from the calcine.

During the past few years, it has been the practice in several plants to charge unroasted cold concentrates along the side walls of the reverberatory furnace. This has eliminated much of the dust problem but has resulted in a low grade matte which increases the expense of subsequent refining by a bessemerizing operation.

It will be observed that according to the present invention the part of the ore charge which is exposed to the direct action of the heating flames is covered with a layer of molten matte and slag, which although continuously allowed to run away is continuously replenished by the action of the flames upon fresh portions of the ore, and that no unmelted portion of the ore therefore is exposed to give rise to dusting losses.

As applied to the treatment of iron oxide ores, by means of a process according to the present invention continuous smelting may be carried on, the steel produced being refined to any desired degree and produced of a constant quality for tapping off periodically from the discharge end of the furnace. The whole of the reactions which correspond to the usual operations of producing pig-iron, re-melting and refining it in a basic open hearth reverberatory furnace, being carried on in a single furnace without interruption and with a considerable economy of fuel as well as a gain in the uniformity of the product.

The present invention furthermore comprises improvements in the construction of furnaces suitable for carrying the invention into effect. It is a feature of the invention to provide a furnace for ore smelting comprising in combination a hearth, a conveyor for delivering ore continuously to one end of said hearth and causing it to advance over the same, fuel burners over the hearth directed downwardly to cause flames to play upon ore thereon, a well at the opposite end of the hearth from the conveyor to receive molten metal, a roof covering the hearth and the well and an outlet for flue gases from the furnace at the well-end thereof.

In one construction the conveyor comprises inclined reciprocable hearth-sections, means for reciprocating said sections longitudinally, a hopper for delivering fuel on to said sections and a plunger operatively connected to the hearth-sections to reciprocate therewith and located at the bottom of the hopper so as to push charges of fuel from the hopper onto the sections.

By disposing the hearth-sections in a plurality of banks, some nearer to and some further from the end of the hearth, in combination with means whereby the stroke of the movement of the hearth-sections in one bank may be adjusted so as to bear a variable relationship to the corresponding movement of the hearth-sections in another bank, it is possible to feed the material into the furnace in such a manner that the front face of the advancing ore body has the desired slope so as to be presented advantageously to the action of the fuel burners.

The invention will now be described with reference to the accompanying drawings which show two constructions of furnace and of regenerators and recuperators connected therewith.

In the drawings—

Figure 1 is a vertical longitudinal section of a copper refining furnace and associated recuperators;

Fig. 2 is a longitudinal section through a furnace for the production and refining of steel;

Fig. 3 is a plan of the same;

Fig. 4 is a plan of a regenerator for use with the furnace of Figures 2 and 3; and Fig. 5 is a vertical longitudinal section of the same.

Referring to Fig. 1, it will be convenient to begin by describing the construction of the furnace about the end at which the ore is fed thereinto. At this end a large ore hopper 11 is provided, below which is located a travelling pan conveyor 12. The hopper wall is cut away at 13 above the conveyor for a sufficient depth to allow the conveyor to carry forward from it a layer 14 of charge to be smelted, several feet in thickness. The width of the conveyor will vary in accordance with the size of the furnace so as to be approximately equal to its width. It may, for example, be 12 feet wide. The end wall 15 of the furnace lies close against the wall of the hopper 11 from which the ore is carried forward and is formed with an arch high enough to admit the advancing body of ore. The conveyor 12 extends sufficiently far beyond the end wall of the furnace to carry the ore up to a smelting zone 16 therein.

The furnace roof 17 is arched or suspended to provide a considerable space above the ore thus introduced, but about the portion which overlies the inner end of the conveyor the roof is inclined downwardly as at 18, more or less parallel to the sloping front 19 of the advancing charge, and this downwardly inclined portion overlies what has hereinbefore been referred to as the smelting zone of the furnace. In the inclined portion of the roof there are located a number of fuel burners 20, for example oil fuel burners, or it might be pulverized coal burners, the flame of which is directed downwardly onto and more or less normal to the head of the advancing ore body. Consequently the head of the ore body is smelted and the fuel and air in the burners are regulated so as to keep the advancing face of the ore properly sloped so that no caving will take place which would expose any cold charge to the flame and so that the charge as it is melted will run down the inclined advancing face of the charge. Molten matte and slag immediately it is formed runs down the inclined smelting face and away from the body of ore beneath it, fresh portions of hot but unmelted ore continually being advanced by the conveyor into the smelting zone and the molten slag and matte run down the slope as fast as they are formed.

Beyond the inclined smelting face and the inclined roof of the furnace which overlies it there is a horizontal extension 21 of the furnace, the bottom of which lies well below the level at which the ore is introduced and which provides a well 22 into which the molten material runs. The products of combustion pass through the extension 21 of the furnace on their way to the exit 23 and maintain the metal in a molten condition.

From the exit 23 the gases pass into a recuperator 24 where the incoming air for the burners is pre-heated.

When ores are being smelted which contain sulphur, an oxidizing flame will be used, the full amount of air will be delivered against the advancing sloping front and the external fuel will be reduced so as to oxidize the sulphur and cause the heat of its combustion to be employed in smelting the charge. In the case of ores which contain an adequate amount of sulphur and with hot blast provided it may be possible to dispense with external fuel altogether once the furnace has become sufficiently heated and then to allow the smelting to progress by the combustion of the sulphur in the charge.

One advantage of the invention herein described over the blast furnace for pyrite smelting is that in case the fuel is reduced too much, there is no trouble from a freeze-up, it being only necessary to admit a little more fuel with the air through the burners.

Certain details of construction of the furnace merit mention: The pan type conveyor 12 which is well known in itself, is preferably the type in which the pans or plates are convex on their outer surfaces and in passing over the innermost sprocket 25 which lies below the smelting zone, their curvatures combine together to form a cylindrical surface. Against this cylindrical surface of the conveyor a scraper 26 is pressed to prevent any ore from falling out of the furnace. The scraper is supported upon a transverse partition wall 27 which helps to support the weight of the ore in the smelting zone.

The recuperator 24 is in the construction shown located below the furnace. The exit flue 23 leads to an inlet 30 to the recuperator and the hot gases passing into the inlet 30 go along the tubes 31 which form the upper part of the recuperator, returning through the lower part 32 to an exit 33 whence they are drawn through a pipe 34, and if desired a heat-interchanger 35 by a fan 36, which delivers them to a stack 37. Another fan 38 delivers fresh air to the heat-interchanger 35 and this passes through an intermediate conduit 39 to the fresh air inlet 40 of the recuperator. Here the air passes upwardly between the tubes 32, 31 to the heated air outlet 41 and thence by the pipe 42 to the fuel burners 20.

It will be observed that in this furnace, and in the recuperator also, once the parts have reached their normal temperature they all remain at the same temperature during the whole of the operation of the furnace, because the operations at any given zone are always of the same kind. This makes for long life of the furnace parts. It should further be pointed out that owing to the absence of dust in the flue gases passing through the recuperator, (due to the character of the operation in the smelting zone) the recuperator is not liable to become choked.

It will be understood that the furnace described can be used for reducing instead of oxidizing by applying a reducing flame by the burners 20 or by mixing fine coal or other fuel with the charge in the hopper 11. Such is the principle of the operation of the steel refining furnace illustrated in Figs. 2 to 5 which will now be described.

Referring to Figs. 2 and 3, the furnace comprises an inclined hearth 50 over which is a raised roof portion 51 and a prolonged well 52 which immediately adjoins the lower end of the hearth 50 and is covered by a reverberatory roof 53. At the end of the well 52 there is a transverse wall 54 which constitutes a weir over the upper edge 55 of which molten metal may flow into a reservoir 56. From the reservoir 56 there is a tapping spout 57. Above it in the side wall of the furnace there is an exit aperture 58 for flue gases.

Returning to the hearth end of the furnace this is provided with an end wall 59 and the bottom of the end wall is supported clear of the top end of the hearth 50 so as to provide an aperture 60 for the admission of the material to be smelted. Outside the aperture 60 there is located the bottom of a feed hopper 61.

From the plan of the furnace Fig. 3, it will be observed that there are two hoppers 61 side by side in the width of the furnace and that the end wall 59 is supported by a series of pillars 62 which sub-divide the aperture 60 into sections. There are three such sections for each hopper and they are provided with three feed cylinders 63 in each of which works a plunger 64. The feed cylinders extend horizontally from the bottom of the hoppers 61, in a direction away from the furnace and in line with the apertures 60. The plungers 64 are connected by rods 65 to cross-heads 66 and the cross-heads 66 are reciprocated by means of connecting rods 67 actuated by cranks 68 on a crank-shaft 69. A motor 70 is provided which by suitable reduction gearing drives the crank-shaft 69 and reciprocates the plungers 64 at a slow speed. There are two crank-shafts 69, one to each hopper and the connections to the motor 70 comprise a clutch mechanism or the like, the details of which are not shown in the drawings, so that either of the crank-shafts can be temporarily disconnected from operation or set in motion independently of the other. The effect of operation of the plungers is to push a quantity of ore into the furnace on the forward stroke, and when retracted to permit a fresh quantity of ore to fall out of the hopper in front of the plungers.

It would not suffice merely to push ore into the furnace in this manner without providing means to ensure that the ore does not merely pile up at the entrance but moves progressively over the hearth 50 and exposes a suitable sloping front face to the smelting zone 71 therein. To this end hearth-sections 72, 73 are provided which can be reciprocated. The sections 72 are arranged in one bank lying nearest to the entry for the ore in the furnace and one section is provided opposite each plunger. Thus there are six sections 72 in the width of the furnace. The second bank of hearth-sections 73 lies nearer to the lower end of the hearth 50 and in this bank also there are six hearth-sections, one in line with each of the plungers aforesaid. The hearth-sections are mounted on inclined guide rods 74, 75, so that they may slide in a direction parallel to the slope of the hearth. Ears 76, 77 on the hearth-sections embrace the guide rods 74 and lie one each side of a cross-head 78 which also slides upon the guide rod. The cross-head 78 is connected by a push rod 79 to an operating lever 80. The operating lever 80 is slotted so that the push rod 79 can slide through it and pegs 81 on the push rod 79 can be inserted in any one of the series of holes in the push rod. The pegs 81 make contact with the front and back of the lever 80 and this construction provides an adjustable amount of lost motion between the lever 80 and the push rod 79. The hearth-sections in the second bank are similarly connected by a second push rod 82 to the lever 80. The lever 80 is pivoted at 83 to a link 84 at its lower end, and at its upper end it is connected to the plunger 64 so as to be reciprocated thereby.

The upper surfaces of the hearth-sections 72, 73 are stepped as shown so that they can exert a pushing action on the ore in the hearth and thus when they are reciprocated they will cause the ore to move forwardly down the inclined hearth. By adjusting the amount of the stroke of the movement of the hearth-sections by means of the pegs 81, it is possible to adjust the slope of the front face of the advancing ore body.

Fuel burners 85 are located in a row across the furnace in a sloping portion 86 of the roof thereof which connects the raised portion 51 with the reverberatory roof 53. The burners 85 direct a heating flame upon the front face of the ore body. The burners 85 are supplied by a hot air trunk 87 and are provided with fuel pipes 88.

In the operation of this furnace ore mixed with fuel is introduced to the hopper 61 and thereby fed into the furnace as already described. The coal used would preferably be washed coal crushed fairly fine but not necessarily pulverized. If the coal to be used is non-coking, at least a part of the hot gases leaving the recuperator or regenerators could be utilized in drying and warming up the charge. If the coal to be used is a coking coal, then moisture would be left in the charge to utilize the fixed carbon in the generation of gas at the melting surface. For the ore, preferably clean iron sands or concentrates, would be used leading to the production of a comparatively small amount of slag in the smelting operation.

The front face of the ore body in the smelting zone 71 is raised to incandescence by means of the burners 85 and it is contemplated that once the state of incandescence is reached it may be unnecessary to continue to introduce fuel by the supply pipes 88, the heat of the furnace being maintained by combustion of the fuel which is admixed with the ore, although should the temperature of the furnace fall it can easily be raised by injection of fuel at the burners 85 whenever desired. The gases given off by the fuel, as well as the fuel itself, will be burned by the air introduced at 85, and if the quantity of fuel is adequate reducing conditions will prevail at this portion of the furnace.

Consequently iron will be reduced and melted and slag formed and the iron and slag will trickle down the sloping face of the ore body into the well 52. An excess of combustible gases will be produced in the smelting zone 71 and will pass through the reverberatory zone over the well 52 and the molten metal therein.

A number of auxiliary burners 90 are provided at the entry to this zone whereby air may be blown into the furnace from the trunk 87 and part of the combustible gases burned at this point. By this means the temperature in the reverberatory zone may be raised to any desired degree. Additional fuel supply pipes 91 are provided to the burners 90 so that if there is insufficient heat in the fuel gases, for example at the time of starting the furnace, additional fuel may be blown in and burned at this point.

About one half of the distance along the length of the well 52 there is located a transverse dam 93 which consists of a water cooled cross tube covered with refractory material. The upper edge of the dam 93 lies slightly above the normal liquid level in the well 52 and serves to prevent passage of slag, while beneath the dam there is an opening adequate to permit the free passage of molten metal. In the side of the furnace there is a slag door 94. There may also be provided openings 95, 96 at various points along the length of the well 52 for tapping molten metal in various stages of refinement if it is desired to utilize less highly refined material than can be drawn off from the reservoir 56.

Under the conditions prevailing in the smelting zone 71 a relatively cold slag will be formed containing a considerable amount of FeO, and the heavier metallic portion of the product will contain a considerable amount of carbon and other impurities together with some iron oxide. The intense heat produced by the burners 90 above the metal in the first portion of the well 52 will raise the material therein to a temperature as high as desired, so that the carbon in the metal will become very active in reducing any FeO contained in it. The carbon monoxide thus liberated will cause violent ebullitions of the bath. The FeO in the slag will be reduced by the liberated carbon monoxide and the resulting iron will drop out of the slag into the underlying metal. It will be understood that a good part of any sulphur and phosphorus which may be in the metal when it enters the well 52 will be transferred to the slag in the course of the refining operation just described. It is, however, characteristic of the process of the present invention that most of the sulphur in the smelting zone will pass directly into the flame of the furnace and will not pass into the iron at all. The metal in the smelting zone and in the well 52 of the furnace is protected from sulphur in the impinging flames by the overlying layer of slag.

Purified slag is drawn off through the slag notch 94 and metal passes beneath the dam 93 into the second part of the well 52. After passing the dam 93 the metal will correspond approximately to metal at the slag-skimming stage in the basic open hearth refining process.

After passing the dam 93 in the second portion of the well 52 the metal will be further purified as in the second slag-forming stage of the basic open-hearth process, small amounts of lump oxide or other flux being added through suitable charging doors, not shown in the drawings, as may be required. Additional air nozzles 97 are provided at the entry to this second refining zone to maintain the heat of the metal. If necessary additional fuel can be introduced to ensure the desired temperature.

Finally the refined metal together with the small amount of slag which it will carry which has formed beyond the dam 93 passes over the lip 55 into the reservoir 56 where the slag will be skimmed through an opening 98 in the end of the furnace. The molten metal can be drawn off at intervals as desired into ingot molds through the spout 57.

To produce 300 tons of steel per day in a furnace having a width of say 10 to 12 feet, the rate of movement of the charge through the furnace would be less than one inch per minute so that considerable time is allowed for the conduct of the necessary reactions.

The air to be delivered to the trunk 87 does not have to find its way through a mass of ore in the furnace, as in a blast furnace, and will therefore require to be delivered at only a low pressure of a few inches of water so that instead of using a compressor for the blast a fan can be employed. This moreover reduces the risk of air leaks in the supply and in the heating arrangements therefor. The air may therefore be passed directly through a recuperator under the blast pressure as already described with reference to Fig. 1. As the volume of combustion gases generated in proportion to the heat produced is materially less than in the case of an open hearth furnace, the surface of the recuperators or regenerators required is correspondingly reduced. The volume of gases is less not only because of the more direct application of the flame to the work, but also because of the fact that the fuel gases produced are largely or wholly directly generated from the coal within the furnace itself and do not carry with them a large bulk of nitrogen, as would be the case were producer gas used for heating the furnace.

Turning to the regenerator illustrated in Figs. 4 and 5, in these figures 53 represents the furnace of Figs. 2 and 3, and 58 the lateral gas exit therefrom which crosses the top of the regenerator as best seen in Fig. 5. Below the transverse flue 58 and partitioned from it by a horizontal partition 100, there are two header chambers 101, 102, subdivided by a vertical partition 103 which is shown in dotted lines in Fig. 4. Below the header chambers 101, 102 is a second transverse air flue 104. The header chambers 101, 102 are each connected with the exit flue 58 above, and with the air flue 104 below, by means of circular valve openings 105, 106 the axes of which in each chamber are vertically in line with one another and which form seatings for a single mushroom valve 107 mounted on a long sliding stem 108 which passes through the top of the transverse flue 58. The mushroom valve heads 107 are provided with water cooling the supply of which passes through the stems 108 in well known manner. Each of the mushroom valves operates as a two-way valve. When it is lowered it closes its header chamber from the air flue 104 and opens it to the gas flue 58. The header chambers 101, 102 each open into a checker brick regenerator chamber 109 or 110, as the case may be.

At the other end of the regenerator chambers are two further header chambers 111, 112. Below these is a transverse furnace gas exit flue 113 and above them an air entry flue 114. The header chambers 111, 112 are connected to these transverse flues by means of ports controlled by two-way mushroom valves 115, 116 similar to the mushroom valves 107 hereinbefore described. An air trunk enters the air inlet flue 114 at 117 and the air trunk 87 leaves the transverse air flue 104 as shown in the drawings. The air trunk 117 extends from a heat-interchanger 118 and is supplied by a fan 119. The hot furnace gases passing out through the transverse flue 113 go through an up-cast flue 120 to the top of the heat-interchanger and thence out at the bottom thereof to a fan 121 which delivers them to a stack 122.

In operation of this regenerator, as will be readily understood, the mushroom valves are so manipulated that one of the regenerator chambers, say 110 receives hot gases from the flues 58 and passes them out to the flue 113 thereby becoming heated simultaneously. The other regenerator chamber which has previously been heated will receive partially warm air from the heat-interchanger 118 and will pass it out as heated air to the trunk 87. When the checker brickwork in the chamber 109 has become cooled by this passage of air therethrough the two-way mushroom valve will be reversed and the chamber 110 used to heat up the incoming air while the chamber 109 is reheated by the exit gases.

It will be understood that while the apparatus of Figs. 2 to 5 has been described in this specification in relation to its use in the production of refining of iron, the various parts could equally be used in the smelting and refining of other metals, or the production of glass or kindred operations and in particular the pusher type method of feeding the ore with the aid of reciprocable hearth-sections could be employed with advantage in place of the conveyor illustrated in Fig. 1. In using the invention for the manufacture of glass the usual ingredients which require to be melted together to produce the glass will be introduced into the furnace in lieu of the metallic ore, the apparatus being similar.

I claim:

1. A process for smelting ores and for kindred operations on minerals characterized by introducing mineral continuously to a furnace behind a smelting zone therein so as to present a stable sloping smelting face to the smelting zone, the point of introduction being not higher than the upper level of the smelting face, moving the mineral bodily forward as a whole into the smelting zone and applying heating flames directly to the said sloping smelting face of the mineral in the smelting zone in a direction opposed to the direction of advance of the mineral, whereby said sloping face is continuously melted and the melted portion allowed to run away down the slope and expose fresh material to the flames, said mineral being introduced to the smelting zone as a sulphide ore, and a sufficiency of oxygen being admitted with the heating flames to combine with the sulphur from the ore and utilize the heat of combustion thereof.

2. A process for smelting ores and for kindred operations on minerals characterized by introducing mineral continuously to a furnace behind a smelting zone therein so as to present a stable sloping smelting face to the smelting zone, the point of introduction being not higher than the upper level of the smelting face, moving the mineral bodily forward as a whole into the smelting zone and applying heating flames directly to the said sloping smelting face of the mineral in the smelting zone in a direction opposed to the direction of advance of the mineral, whereby said sloping face is continuously melted and the melted portion allowed to run away down the slope and expose fresh material to the flames, said mineral being introduced to the smelting zone as a copper sulphide ore, and maintaining a sufficiency of oxygen in the smelting zone to combine with a portion only of the sulphur of the ore thereby producing a molten matte.

ALEXANDER GRANT McGREGOR.